US011499012B2

(12) United States Patent
Jeol et al.

(10) Patent No.: US 11,499,012 B2
(45) Date of Patent: Nov. 15, 2022

(54) METHODS FOR MAKING POLY(ARYL ETHER SULFONE) POLYMERS AND POLYMER COMPOSITIONS AND ARTICLES INCLUDING THE SAME

(71) Applicant: SOLVAY SPECIALTY POLYMERS USA, LLC, Alpharetta, GA (US)

(72) Inventors: Stéphane Jeol, Cumming, GA (US); Clay Owens, Woodstock, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/096,540

(22) PCT Filed: Apr. 27, 2017

(86) PCT No.: PCT/EP2017/060128
§ 371 (c)(1),
(2) Date: Oct. 25, 2018

(87) PCT Pub. No.: WO2017/186881
PCT Pub. Date: Nov. 2, 2017

(65) Prior Publication Data
US 2019/0112428 A1    Apr. 18, 2019

Related U.S. Application Data

(60) Provisional application No. 62/329,462, filed on Apr. 29, 2016.

(51) Int. Cl.
*C08G 75/23*    (2006.01)
*C08G 75/0281*  (2016.01)
*C08G 65/40*    (2006.01)

(52) U.S. Cl.
CPC .............. *C08G 75/23* (2013.01); *C08G 65/40* (2013.01); *C08G 75/0281* (2013.01)

(58) Field of Classification Search
CPC ..................................................... C08G 75/23
See application file for complete search history.

(56) References Cited

U.S. PATENT DOCUMENTS

| 4,794,155 A * | 12/1988 | Woo ....................... C08G 61/12 528/125 |
| 2008/0118853 A1* | 5/2008 | Bender ................. C08G 65/40 430/96 |
| 2012/0149796 A1* | 6/2012 | Weber .................... C08G 75/23 521/180 |
| 2013/0109831 A1 | 5/2013 | Lutz et al. |
| 2015/0337085 A1 | 11/2015 | Weber et al. |
| 2017/0355821 A1* | 12/2017 | Jeol ........................ C08G 65/40 |

FOREIGN PATENT DOCUMENTS

| JP | H06329907 A | 11/1994 |
| JP | 2012211290 A | 11/2012 |
| JP | 2013502476 A | 1/2013 |
| JP | 2016511770 A | 4/2016 |
| WO | 2014095973 A1 | 6/2014 |

OTHER PUBLICATIONS

Hait S. B. et al., "Synthesis of bis(hydroxyethyl ether)s of aromatic dihydroxy compounds and poly(ether-carbonate)s with bisphenol A", Polymer International, 1998, 47(4), p. 439-444—Society of Chemical Industry.

Dongyang Chen, et al., "Synthesis and properties of novel sulfonated poly(arylene ether sulfone) ionomers for vanadium redox flow battery", Energy Conversion and Management, vol. 51, pp. 2816-2824 (9 pg.).

* cited by examiner

*Primary Examiner* — Liam J Heincer
(74) *Attorney, Agent, or Firm* — Beatrice C. Ortego

(57) ABSTRACT

Described herein are methods for making poly(aryl ether sulfone) ("PAES") polymers and polymer compositions including the PAES polymers. The method includes reacting a first monomer and a second monomer in a reaction mixture including a base. In some embodiments, the first monomer, second monomer and base can be selected such that halogen salts are not formed during the reacting. In some embodiments, the method can also be a solvent free process. The PAES polymer and polymer compositions can be desirable in many application settings including, but not limited to, electronic components.

16 Claims, No Drawings

METHODS FOR MAKING POLY(ARYL ETHER SULFONE) POLYMERS AND POLYMER COMPOSITIONS AND ARTICLES INCLUDING THE SAME

RELATED APPLICATION

This application claims priority to U.S. provisional application No. 62/329,462 filed on Apr. 29, 2016 and European patent application No. 16187794.9 filed on Sep. 8, 2016, the whole content of this application being incorporated herein by reference for all purposes.

FIELD OF THE INVENTION

The invention relates to methods for making poly(aryl ether sulfone) ("PAES") polymers. The invention further relates to PAES polymers and compositions including the PAES polymer. Still further, the invention relates to articles incorporating the polymer compositions.

BACKGROUND OF THE INVENTION

Polymer synthesis is a process that involves many steps. Aside from performing the polymerization reaction, by-products formed during polymerization need to be removed from the polymer (in some cases the by-products are separated by filtration) and the synthesized polymer separated from the reaction mixture. Moreover, the amount of filtration required increases significantly with the purity requirements of the polymer composition, dictated by the intended application setting. For example, in application settings such as electronic devices, polymers essentially free of halogen content are highly desirable. Correspondingly, significant filtration (e.g. multiple filtration steps) are required to reduce halogen content of the polymer to acceptable levels, and the efficiency of the polymer synthesis process is decreased.

DETAILED DESCRIPTION OF THE INVENTION

Described herein are methods for making poly(aryl ether sulfone) ("PAES") polymers and polymer compositions including the PAES polymers. The methods have significant processing advantages over traditional PAES polymer synthesis methods. The methods described herein are salt free and halogen free processes and, in some embodiments, can further be solvent free processes. Additionally, because the described methods are halogen free processes, the resulting polymer compositions can also be halogen free. Halogen free polymer compositions can have significant advantages in a variety of application settings including, but not limited to, electronic applications. As used herein, a halogen refers to F, Cl, Br, I and At. Finally, the methods contains less steps than the traditional approaches, which is more cost efficient.

In traditional approaches, PAES polymers are synthesized in a reaction mixture including a diphenol monomer (a monomer containing two hydroxyl group linked to an aromatic ring), a dihalide monomer, a solvent and a stoichiometric amount or a molar excess of an inorganic base relative to the content of hydroxyl, where at least one of the diphenol and dihalide include a sulfone group (e.g. a sulfone diphenol or dihalide). During reaction, the diphenol is activated by the inorganic base to form a diphenoxide that can then react with the dihalide to form the PAES polymer and a by-product (a salt) that is generally not fully soluble in the reaction mixture. At any step of the polymerization reaction, the PAES polymers refers to a mixture of monomers, oligomers and polymers of different molecular weights that have halide, hydroxyl or phenoxide chain ends. During the polymerization reaction, one mole or inorganic base is consumed to activate one mole of hydroxyl, which means that a high quantity of salt in produced. For example, if the inorganic base includes a sodium or potassium salt (like sodium hydroxide or potassium carbonate), the induced reactions can generate sodium or potassium diphenoxide salts or oligomers/polymers containing phenoxide salts that further react with the dihalide monomer or oligomer/polymers containing halide to ultimately generate the PAES polymer and a sodium halide (e.g., sodium chloride) or potassium halide (e.g., potassium chloride) as a by-product. The high quantities of salts undesirably increase the viscosity of the reaction mixture and, furthermore, generally require filtration to separate the salts from the PAES polymer in solution prior to recovery of the PAES polymer by devolatilization (e.g. evaporation of the solvent) or coagulation. As the PAES polymer is synthesized from dihalide monomer, it ultimately contains a portion of halogen atoms at the chain ends.

The present invention relates to a method for forming a poly(aryl ether sulfone) ("PAES") polymer, the method comprising reacting a first monomer and a second monomer in a reaction mixture,
wherein either
(A) the first monomer is a diphenol represented by the formula:

$$HO-M_A-OH \quad \quad (M1)$$ and the second monomer is a diarylether containing a sulfone represented by the formula:

$$A^1-O-M_B-O-A^2 \quad \quad (M2),$$ or (B) the first and second monomer, identical or different, are selected from the group consisting of formulae:

$$A^1-O-M_B-O-M_A-OH \quad \quad (M3),$$

$$A^1-O-A^2-SO_2-M_A-OH \quad \quad (M4),$$ and

$$HO-M_A-O-M_B-O-M_A-OH \quad \quad (M5)$$

wherein
$M_A$ is represented by the formula:

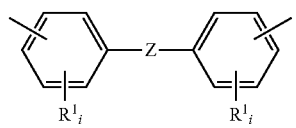

(1)

wherein each $R^1$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each i is an independently selected integer from 0 to 4; and Z is a bond, $-SO_2-$ or $-C(CH_3)_2-$;

$M_B$ is represented by the formula:

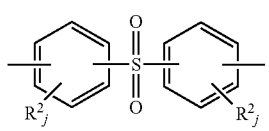

(3)

where each $R^2$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

$A^1$ and $A^2$ are represented by the following formulae, respectively:

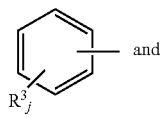 and (4)

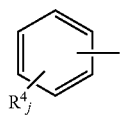

(5)

where each $R^3$ and $R^4$ is independently selected from the group consisting of a halogen, an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each j is an independently selected integer from 0 to 4 wherein the reaction mixture comprises a base, wherein the total base concentration is from about 0.0001 to about 0.2, relative to the total number of moles of monomer derived —OH groups in the reaction mixture.

The polymerization methods described herein include reacting specifically selected monomers in a reaction mixture including a catalytic amount of base and, optionally, a solvent, where the reacting does not generate halide salts. In some embodiments, the monomers are free of halogen atoms and, accordingly, neither halogen containing salts nor halogen terminated PAES polymers are formed during the reacting. Similarly, because halide salts are not generated during the reacting and because the PAES polymer is free of any halogen atoms, in some embodiments, the halogen content of the resulting PAES polymer (and subsequently formed polymer compositions) can be extremely low or even undetectable Furthermore, because the base is not consumed, the base is not present in excess relative to the monomer species. Such approaches have significant processing advantages over traditional methods at least because it obviates the need to filter out insoluble salts prior to PAES polymer recovery. Furthermore, in some embodiments, the monomers are halogen free (do not have any halogen atoms).

In some embodiments, the polymer compositions are halogen free. As used herein, a halogen free polymer composition has a halogen content of no more than about 300 part per million ("ppm"), relative to the total parts of the polymer composition. As used herein, ppm implicitly refers to ppm by weight, unless explicitly noted otherwise. Because the PAES polymer is formed from non-halogen containing reaction mixture, the only source of halogen content in the formed PAES polymer is from trace impurities. Accordingly, for polymer compositions formed from the PAES polymer and non-halogen containing components, halogen content is limited to trace impurities from the reaction mixture and the other components in the polymer composition. In some embodiments, the halogen concentration in the polymer is no more than about 200 ppm, no more than about 100 ppm, no more than about 90 ppm, no more than about 80 ppm, no more than about 50 ppm, no more than about 10 ppm or no more than about 1 ppm. In some embodiments, the halogen free polymer compositions can have an undetectably low halogen content. In some embodiments, the halogen content of interest can be limited to chlorine content. Halogen content can be measured by combusting a sample of the PAES polymer (or polymer composition made therefrom) under a stream of oxygen. The combustion products can then be passed through a concentrated sulfuric scrubber and the into a titration cell, where HX (where X is a halogen atom) from the combustion process is absorbed in a 75% v/v acetic acid solution. The HX/acetic acid solution is then titrated with silver ions generated coulometrically and the percent halogen in the sample is calculated from the integrated current and sample weight. The process method just described can be performed using a ThermoGLAS 1200 Total Organic Halogen Analyzer. In embodiments in which the halogen content of interest is limited to chlorine content, the amount of chlorine in the PAES polymer or corresponding polymer composition can be determined according to ASTM 25808-09a or D7457-12. A person of ordinary skill in the art will recognize the halogen concentrations above also apply to the halogen concentration of the reaction mixture during the reacting and prior to any filtration or separation processing which reduces the halide salt concentration of the reaction mixture (e.g. filtration of halide salts).

Synthesis of Poly(Aryl Ether Sulfone) Polymers

The methods for synthesizing or forming PAES polymers described herein involve reacting a first monomer and a second monomer in a reaction mixture including a base. The base can be an inorganic base or an organic base. In some embodiments, the reaction mixture can be free of solvent. In alternative embodiments, reaction mixture can include a solvent. It was surprisingly discovered that appropriate selection of reaction parameters significantly increase the average molecular weight of the PAES polymer.

The Reaction Mixture

The reaction mixture includes a first monomer, a second monomer and a base. As used herein, a monomer refers to a molecule that is incorporated into the PAES polymer via reaction with another molecule, the same or different. Preferably, for halogen free polymer compositions, the first and second monomers are halogen free (e.g. do not contain a halogen atom). In other embodiments, the first or second monomer can contain one or more halogen atoms, none of which are dissociated from the monomer during polymerization (e.g. do not form a halide salt during polymerization of the monomers).

The first and second monomers can be independently selected form the group consisting of a diphenol, a diaryle- ther containing a sulfone and a phenol arylether containing a sulfone. The diphenol is represented by the formula: HO-$M_A$—OH, where —$M_A$— is represented by the following formula:

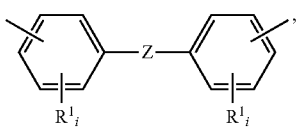

(1)

where each $R^1$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each i is an independently selected integer from 0 to 4; and Z is a bond, —$SO_2$— or —$C(CH_3)_2$—. In some such embodiments, —$M_A$— can be represented by the following formula:

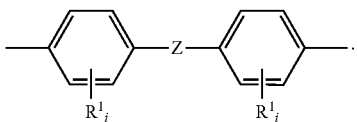

(2)

In some embodiments, in which —$M_A$— is represented by Formula 1 or 2, each i is zero. Examples of desirable diphenols include, but are not limited to, 4,4'-biphenol, Bisphenol A, and Bisphenol S. In preferred embodiments, the diphenol is selected from 4,4'-biphenol or Bisphenol A.

The diarylether containing a sulfone is represented by the formula: $A^1$—O—$M_B$—O—$A^2$ where —$M_B$— is represented by the following formula:

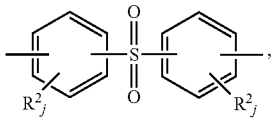

(3)

$A^1$— and $A^2$— are represented by the following formulae, respectively:

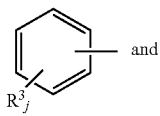

and (4)

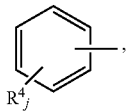

, (5)

where each $R^2$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each $R^3$ and $R^4$ is independently selected from the group consisting of a halogen, an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each j is an independently selected integer from 0 to 4. In some such embodiments, each j is 0.

In some embodiments, $M_B$ is represented by the following formula

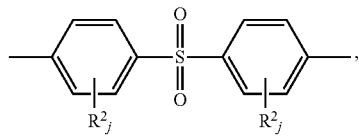

(6)

$A^1$ and $A^2$ are represented by the following formulae, respectively:

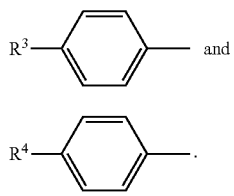

and (7)

.

(8)

In some such embodiments, each j is 0. Examples of desirable diarylethers containing a sulfone include, but are not limited to, 4,4'-diphenoxydiphenylsulfone ("DPDPS"), 4,4'-di(4-methylphenoxy)diphenylsulfone, 4,4'-di(3-methylphenoxy)diphenylsulfone, 4,4'-di(2-methylphenoxy)diphenylsulfone, 4,4'-di(4-fluorophenoxy)diphenylsulfone, 4,4'-di(4-chlorophenoxy)diphenylsulfone. Excellent results were obtained with DPDPS.

The phenol arylether containing a sulfone is represented by at least one of the following formulae:

$A^1$—O—$M_B$—O—$M_A$—OH (9), $A^1$—O—$A^2$—$SO_2$—$M_A$—OH (10) and

HO—$M_A$—O—$M_B$—O—$M_A$—OH (11).

In some embodiments, as described below, the first monomer is a diphenol and the second monomer is a diarylether containing a sulfone. In such embodiments, the relative diphenol molar concentration (mol. diphenol/mol. diarylether containing a sulfone) in the reaction mixture is at least about 0.5, at least about 0.6, at least about 0.7, at least about 0.8, at least about 0.85, at least about 0.9 or at least about 0.95, during at least a portion of the reacting. Additionally or alternatively, the relative diphenol molar concentration is no more than about 1.5, no more than about 1.4, no more than about 1.3, no more than about 1.25, no more than about 1.2, no more than about 1.15, no more than about 1.1, or no more than about 1.05, during at least a portion of the reacting. In some embodiments, the concentration of the diphenol in the reaction mixture can be from about 20 wt. % to about 50 wt. % and the concentration of the diarylether containing sulfone can be about 20 wt. % to about 80 wt. %, both relative to the total weight of the reaction mixture and during at least a portion of the reacting. As used herein, "during at least a portion of the reacting" refers to a point in time during the reaction time, as described below.

In some embodiments, as described below, the first and second monomers are identical and selected from Formulae (9), (10) and (11) (e.g. the first and second monomers are represented by the same formula (9), (10) or (11) have the same selection of bonding and substitution). In such embodiments, the combined concentration of the first and second monomers in the reaction mixture can be at least about 20 wt. %, at least about 30 wt. %, at least about 40 wt. %, at least about 50 wt. %, at least about 60 wt. %, at least about 70 wt. %, at least about 80 wt. %, or at least about 90 wt. %, relative to the total weight of the reaction mixture. Additionally or alternatively, the combined concentration of the first and second monomers in the reaction mixture can be no more than about 99.9 wt. %, no more than about 95 wt. %, no more than about 90 wt. %, no more than about 80 wt. %, no more than about 70 wt. %, no more than about 60 wt. % or no more than about 50 wt. %, relative to the total weight of the reaction mixture.

As mentioned above, the first and second monomers are reacted in a reaction mixture including a base. The bases of interest herein have a pKa of at least about 7. The pKa is the negative logarithm (base 10) of the acid dissociation constant Ka, and is widely used in the art as a measurement of acid and base strength. In some embodiments, the base has a pKa of at least about 8, at least about 9 or at least about 10.

The base includes an inorganic base, an organic base or a combination thereof. In embodiments in which the base includes an inorganic base, the inorganic base is an alkali metal carbonate, an alkali metal hydroxide, an alkali metal phenoxide or diphenoxide, or alkali metal alkoxide. The alkali metal carbonate is selected from the group consisting of sodium carbonate, potassium carbonate, cesium carbonate, lithium carbonate and any combination of two or more thereof. Preferably, the alkali metal carbonate is selected from sodium carbonate, potassium carbonate and mixtures thereof and, more preferably, the alkali metal carbonate is potassium carbonate. The alkali metal hydroxide is selected from the group consisting of sodium hydroxide, potassium hydroxide, cesium hydroxide, lithium hydroxide and any combination of two or more thereof. Preferably, the metal alkoxide is selected from sodium hydroxide, potassium hydroxide and mixtures thereof and, more preferably, the metal hydroxide is potassium hydroxide. The alkali metal phenoxide is represented by the following formula:

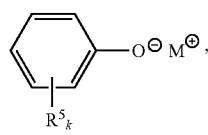

(12)

where each $R^5$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; k is an integer from 0 to 5; and M is an alkali metal selected from the group consisting of sodium, potassium, cesium and lithium. In preferred embodiments k is zero and M is sodium or potassium. Most preferably, k is zero and M is potassium.

In embodiments, the base includes an organic base. As used herein, an organic base refers to molecules having a pKa greater than 7 and containing only atoms of C, H, N, O, P, S, F, Cl, Br, I. In some embodiments, the organic base can be selected from the group consisting of methylamine, dimethylamine, dimethyldiethylamine, dimethyl-sec-butylamine, tri-n-propylamine, triisopropylamine, 1-methyl-2-n-butyl-Δ2-pyrroline, 1-ethyl-2-methyl-Δ2-pyrroline, 1-n-butyl-2-methyl-Δ2-pyrroline, 1,2-dimethyl-Δ2-tetrahydropyridine, 1-n-propylpiperidine, triethylamine, dimethyl-n-butylamine, dimethyl-isopropylamine, dimethyl-t-butylamine, tri-n-butylamine, 1-n-propylpiperidine, 1,2-dimethylpyrrolidine, 1-methyl-2-n butylpyrrolidine, 1-ethyl-2-methylpyrrolidine, 1-n-butyl-2-methylpyrrolidine, 1-ethyl-2-methylpyrrolidine, 1,2-dimethylpiperidine, 1-ethyl-2-methyl-Δ2-tetrahydropyridine, 1,5-diazabicyclo[4.3.0]non-5-ene ("DBN"), 1,8-diazabicyclo[5.4.0]undec-7-ene ("DBU"), 1,4-diazabicyclo[2.2.2]octane, 1,1,3,3 tetramethylguanidine, lysine, arginine, and guanidine. Preferably, the organic base is selected from the group consisting of trisiopropylamine, triethylamine, DBN, DBU, 1,4-diazabicyclo[2.2.2]octane, 1,1,3,3 tetramethylguanidine, guanidine, and mixtures thereof. Preferably, the organic base is DBU or triethylamine.

As mentioned above, in traditional PAES polymer synthesis methods, the base is consumed during polymerization and, correspondingly, an excess of base is used. In the present method, the base is not consumed and, therefore, the base is present in the reaction mixture in a catalytic amount (e.g. significantly less than a stoichiometric amount). The total base concentration of the reaction mixture can be at least about 0.0001, at least about 0.0005, at least about 0.001, at least about 0.002, at least about 0.003, at least about 0.004, or at least about 0.005 and a concentration of no more than about 0.2, no more than about 0.1, no more than about 0.05, no more than about 0.04, no more than about 0.03 or no more than about 0.025 or no more than about 0.02, relative to the total number of moles of monomer derived —OH groups in the reaction mixture. As used herein "monomer derived —OH" groups in the reaction mixture refers to the sum of each monomer's contribution to the —OH group content in the reaction mixture.

The total base concentration is determined from the following formula:

$$\text{total base concentration} = \sum_j B_j, \text{ where } B_j = \frac{S_j^B N_j^B}{\sum_i N_i^{OH} N_i^M},$$

where $B_j$ is the concentration of base j, $N^B_j$ is the total number of moles of the base j in the reaction mixture; $S^B_j$ is the number of basic sites in a molecule of base j; $N^M_i$ is the number of moles of monomer i in the reaction mixture; $N^{OH}_i$ is the number of —OH groups in monomer i; i runs over the number of monomer types in the reaction mixture; and j runs over the number of base types in the reaction mixture. For example, if the reaction mixture consists of 1 mole of first monomer and 1 mole of a second monomer and a single base having 2 basic sites (e.g. alkali metal carbonates), and if the first monomer has only 2 —OH groups (e.g. an unsubstituted diphenol) and the second monomer has no —OH groups (e.g. unsubstituted diaryl ether containing sulfone), then: j=1, i=2, $S^B_j$=2, $N^B_j$=1, $N^{OH}_1$=2, $N^M_1$=1, $N^{OH}_2$=0, $N^M_2$=1. As a further example, if the reaction mixture consisted of, in addition to the aforementioned first and second monomer, a third unsubstituted monomer that was represented by Formula (9), the ranges above would be equal to (2×number of mol. base)/(2×number of mol. first monomer+

0×number of mol. second monomer+1×number of mol. third monomer). The number of basic sites on a base can be determined by titration with HCl. For the inorganic bases described above, the alkali metal carbonates have 2 basic sites and the alkali metal hydroxides and alkali metal phenoxides have 1 basic site, and alkali metal diphenoxides have 2 basic sites.

In some embodiments, the reaction mixture can optionally include a solvent. As used herein, a solvent refers to a liquid that desirably dissolves at least one of the first monomer, the second monomer and the base and which is also distinct from either monomer and the base. The solvents of interest herein have a boiling point of at least about 200° C. Preferably, the solvent has a boiling point of at least about 250° C. and, more preferably, at least about 300° C. As used herein, boiling point refers to the boiling point at atmospheric pressure. In some embodiments, the solvent can be selected from N-methyl pyrolidone ("NMP"), sulfolane, diphenyl sulfone and any combination of two or more thereof. The solvent concentration can be at least about 2 wt. %, at least about 5 wt. %, at least about 10 wt. %, or at least about 20 wt. %. Additionally or alternatively, the solvent concentration can be no more than about 50 wt. %, no more than about 60 wt. %, or no more than about 70 wt. %. Preferably, the reaction mixture is essentially free of a solvent. As used herein, "essentially free" refers to a reaction mixture having a solvent concentration of less than about 2 wt. %, relative to the total weight of the reaction mixture. In some embodiments, the reaction mixture can have a solvent concentration of less than about 1 wt. % or less than about 0.5 wt. %.

The Polymerization Reaction

The polymerization reaction includes reacting the first and second monomers in presence of a base to form a PAES polymer. During the reacting, the reaction mixture is maintained at a selected reaction temperature for a selected reaction time. In general, the reacting can be performed over a range of pressures. It was surprisingly found that appropriate selection of reaction parameters including base concentration alone or in conjunction with appropriate selection of reaction times and temperature can result in PAES polymers having significantly improved average molecular weights.

The reacting is performed in the reaction mixture. The reacting can be represented by a scheme selected from the group consisting of the following schemes:

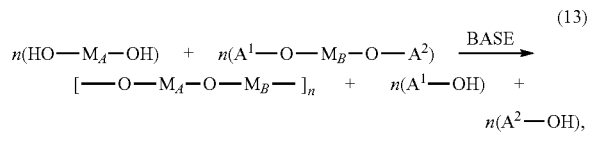

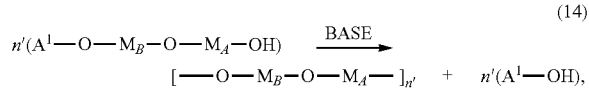

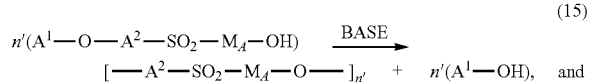

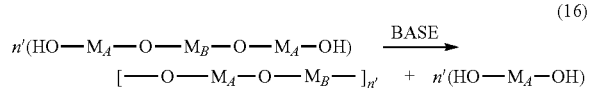

where n is any integer 1 or greater and n' is any integer 2 or greater. For example, n can be any integer from 1 to 1×10$^6$ or even greater or n' can be any integer from 2 to 1×10$^6$ or even greater. The base is used in a catalytic amount, as it is regenerated during the reacting. In some embodiments, the extent of polymerization can be measured from the distillate of the reaction mixture during or after the reacting. For example, referring to Schemes (13)-(16), the aryl alcohols on the right side of the schemes are volatilized during or after the reacting. The aryl alcohols can be condensed in a trap and analyzed to determine the amount of aryl alcohol and, correspondingly, the extent of polymerization of the PAES polymer.

The reacting can be performed by any suitable method known in the art. In some embodiments, the reaction mixture can be reacted in a mixing apparatus including, but not limited to, an agitated reaction vessel or a melt-mixer. Desirably melt-mixing apparatuses include, but are not limited to, kneaders, Banbury mixers, and extruders (e.g. single screw or twin-screw extruders). Regardless of the particular type of mixing apparatus, the apparatus generally includes a mixing element that mixes the reaction mixture during the reaction. In general, the reaction mixture can be introduced into the mixing apparatus as a complete reaction mixture or the reaction mixture can be formed in the mixing apparatus by the separate addition of one or more components into the mixing apparatus. In some embodiments, the reaction mixture can be reacted in a reaction vessel prior to further reaction in a melt mixer. In such embodiments, when the average molecular weight of the PAES polymer in the reaction vessel reaches a threshold value, the reaction can be stopped and the reaction mixture can be transferred to a melt-mixing apparatus for continued reaction until the desired average PAES polymer molecular weight is achieved. The average molecular weight of the PAES polymer in a mixing apparatus can be measured by measuring the torque required to maintain the mixing element of the mixing apparatus at a constant speed.

Notwithstanding the type of mixing apparatus, in some embodiments, when the desired average molecular weight ($M_n$ or $M_w$) of the PAES polymer is achieved (e.g. as measured by the torque on the stirrer), the reaction can be terminated by adding a termination reactant that neutralizes the base and, correspondingly, inhibits further polymerization. Desirable termination reactants are acids having a pKa of no more than about 7.5. In some embodiments, the acid can have a pKa of from about 2 to about 7. Non-limiting examples of organic and inorganic termination reactants having a pKa of no more than about 7 include, but are not limited to, sodium hydrogen phosphate (NaH$_2$PO$_4$), monosodium citrate, sodium hydrogen oxalate, and sodium hydrogen phthalate. Inorganic components, such as, for example, NaH$_2$PO$_4$, having a pKa <7.5 are preferred. In embodiments in which halogen free PAES polymers are not desired, the termination reactant can be methyl chloride or 4,4'dicholorodiphenyl sulfone. The amount of termination reactant added to the reaction mixture can be from about 0.005 wt. % to about 5 wt. %, from about 0.1 wt. % to about 2 wt. %, or from about 0.2 wt. % to about 1 wt. %, based on the total weight of polymers in the reaction mixture.

During the reacting, the reaction mixture is maintained at a selected reaction temperature for a selected total reaction time. In some embodiments, the reaction temperature is from about 200° C. to about 450° C. or from about 250° C. to about 400° C. In some embodiments, the total reaction time can be from about 1 hour to about 72 hours. In some embodiments, the total reaction times can be the sum of discrete reaction times, where the reaction mixture is allowed to cool below the reaction temperature ranges noted above between discrete reaction times. In such embodiments, the sum of discrete reaction times is from about 1 hour to about 72 hours. In some embodiments, the reacting is performed at atmospheric pressure (1.01325 bar). In some embodiments, the reacting is performed at a pressure of at least about 0.1 millibar ("mbar") to no more than about 0.9 bar (sub-atmospheric pressure). In some embodiments, the reacting is performed at a pressure from about atmospheric pressure to no more than about 50 bar or no more than about 20 bar. In embodiments in which the first monomer is a diphenol and the second monomer is a phenol arylether containing a sulfone is represented by Formula (11), preferably the reacting is performed at a pressure between 0.1 mbar to no more than about 0.9 bar. It was surprisingly found that appropriate selection of reaction parameters including base concentration alone or in conjunction with appropriate selection of reaction times can result in PAES polymers having significantly improved average molecular weights. Particularly, it was surprisingly found that reduced base concentrations (within the ranges provided above) can lead to increased $M_n$ and $M_w$. In some such embodiments, it was also surprisingly found that increased total reaction times (within the ranges provided above) further increased $M_n$ and $M_w$, as demonstrated in the Examples below.

Poly(Aryl Ether Sulfone) Polymers and Compositions

The present invention also relates to the PAES polymers obtainable by the method described herein.

According to an embodiment, the present invention relates to a poly(aryl ether sulfone) ("PAES") polymer comprising recurring units ($R_{PAES}$) represented by at least one of the following formulae:

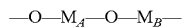

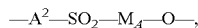

wherein $M_A$ is represented by the formula:

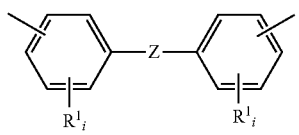

(1)

wherein each R' is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4; and

Z is a bond, —$SO_2$— or —$C(CH_3)_2$—.

$M_B$ is represented by the formula

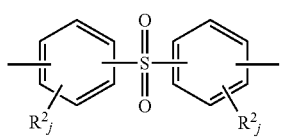

(3)

wherein each $R^2$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and $A^2$ is represented by the formula:

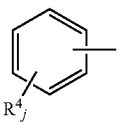

(5)

where each $R^4$ is independently selected from the group consisting of a halogen, an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each j is an independently selected integer from 0 to 4, wherein the PAES polymer comprises a halogen concentration, for example a Cl concentration, of no more than about 300 ppm, relative to the total parts in the PAES polymer composition, for example no more than about 200 ppm, no more than about 100 ppm, no more than about 90 ppm, no more than about 80 ppm, no more than about 50 ppm, no more than about 10 ppm or no more than about 1 ppm.

According to another embodiment, the poly(aryl ether sulfone) ("PAES") polymer comprises:

recurring units ($R_{PAES}$) represented by at least one of the following formulae:

wherein $M_A$ is represented by the formula:

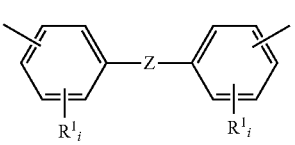

(1)

wherein each R' is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4; and

Z is a bond, —$SO_2$— or —$C(CH_3)_2$—.

$M_B$ is represented by the formula

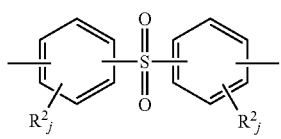

wherein
each $R^2$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
$A^2$ is represented by the formula:

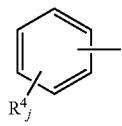

where each $R^4$ is independently selected from the group consisting of a halogen, an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
each j is an independently selected integer from 0 to 4, at least 97% of terminal groups of formula —O—R wherein R is selected from the group consisting of H, $A^2$, an alkyl and a metal (% being based on the total number of terminal groups in the polymer), for example at least 98.5% or at least 99.25%.

According to this embodiment, the alkyl can for example be any linear or ramified alkyl having from 1 to 20 carbon atoms, for example —$CH_3$, —$CH_2$—$CH_3$, —CH($CH_3$)—$CH_3$.

In some embodiments, the PAES polymer refers to any polymer having at least about 50 mol. % recurring units ($R_{PAES}$) represented by a formula selected from the following group of formulae:

 (17),

 (18),

 (19)

 (20).

In some embodiments, the PAES polymer includes at least about 60 mol %, at least about 70 mol %, at least about 80 mol %, at least about 90 mol %, at least about 95 mol %, at least about 99 mol % or at least about 99.9 mol % recurring units ($R_{PAES}$). The connection between the polymer, the reaction scheme and the selection of monomers can be seen by noting recurring unit ($R_{PAES}$) in Formulae (17)-(20) correspond to the recurring units in the polymer on the right hand side of schemes (13)-(16), respectively.

In some embodiments, the PAES polymer can have a weight average molecular weight ("$M_w$") of at least about 10,000 g/mol. In some such embodiments, the PAES polymer can also have an $M_w$ of no more than about 100,000 g/mol, no more than about 90,000 g/mol or no more than about 70,000 g/mol. In some embodiments, the PAES polymer can have a number average molecular weight ("$M_n$") of at least about 5,000 g/mol. In some such embodiments, the PAES polymer can also have an $M_n$ of no more than about 40,000 g/mol, no more than about 35,000 g/mol or no more than about 30,000 g/mol. $M_n$ and $M_w$ can be respectively defined as:

$$M_n = \frac{\sum M_i N_i}{\sum N_i} \text{ and } M_w = \frac{\sum M_i^2 N_i}{\sum M_i N_i},$$

wherein $M_i$ is the discrete value for the molecular weight of a polymer molecule, $N_i$ is the number of polymer molecules with molecular weight $M_i$. $M_n$ and $M_w$ can be measured using Gel Permeation Chromatography (GPC).

The weight average molecular weight (Mw) of the PAES polymer can be determined by gel permeation chromatography (GPC) using methylene chloride as a mobile phase, with polystyrene standards.

The weight average molecular weight (Mw) of the PPSU (co)polymer can be more precisely determined by gel permeation chromatography (GPC) using methylene chloride as a mobile phase and the following GPC configuration: 2×5µ mixed D columns with guard column from Agilent Technologies; flow rate: 1.5 mL/min; injection volume: 20 µL of a 0.2 w/v % sample solution.

More precisely, the weight average molecular weight (Mw) of the PPSU (co)polymer can be measured by gel permeation chromatography (GPC), using methylene chloride as the mobile phase. In the experimental part, the following method was used: two 5µ mixed D columns with guard column from Agilent Technologies were used for separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The weight average molecular weight (Mw) was reported.

The PAES polymers can be incorporated into polymer compositions including optional additives. In general, the optional additives can be incorporated in the polymer composition using methods known in the art. The polymer compositions of interest herein include the PAES polymer. In some embodiments, the concentration of the PAES polymer in the polymer composition is at least about 10 wt. %, at least about 30 wt. %, at least about 50 wt. %, at least about 70 wt. %, or at least about 90 wt. %, at least about 95 wt. %, at least about 99 wt. %, or at least about 99.9 wt. %, relative to the total weight of the polymer composition.

The polymer composition can optionally include an additive or a reinforcing filler. As described above, in some embodiments, the additive or reinforcing filler is each selected to be halogen free such that the resulting polymer composition is also halogen free. Desirable additives include, but are not limited to, a colorant such as a dye or a pigment (e.g. titanium dioxide, zinc sulfide, and zinc oxide); ultraviolet light stabilizers; heat stabilizers; antioxidants such as organic phosphites and phosphonites; acid scavengers; processing aids; nucleating agents; lubricants; flame retardants; a smoke-suppressing agent; an anti-static agent; an anti-blocking agent; or conductivity additives such as carbon black. The additive can have a concentration of at least about 0.1 wt. %, at least about 0.5 wt. % or at least about 1 wt. % and less than about 30 wt. %, less than about 25 wt. %, less than about 10 wt. %, less than about 5 wt. % or less than about 2 wt. %, based on the total weight of polymer composition. A person of ordinary skill in the art will understand that when the polymer composition includes a plurality of optional additives, the aforementioned concentration ranges can apply to each additive or to all the additives as a whole (total additive concentration).

In some embodiments, the PAES polymer composition further includes one or more reinforcing fillers selected from fibrous fillers and particular fillers. A fibrous reinforcing filler is considered herein to be a material having length, width and thickness, wherein the average length is substantially larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50. The particulate fillers have an aspect ratio of at most 5, preferably at most 2. Preferably, the reinforcing filler is selected from mineral fillers, such as talc, mica, titanium dioxide, kaolin, calcium carbonate, calcium silicate, magnesium carbonate, glass fibers, carbon fibers, boron carbide fiber, wollastonite, silicon carbide fibers, boron fibers, graphene, carbon nanotubes, and the like.

The concentration of the reinforcing filler can be at least about 5 wt. %, preferably at least about 10 wt. %, more preferably at least about 15 wt. %, relative to the total weight of the polymer composition. In some such embodiments, the concentration of the reinforcing filler can also be at most about 60 wt. %, at most about 50 wt. %, or at most about 40 wt. %, relative to the total weight of the polymer composition. Preferably, the concentration of the reinforcing filler is from about 0.1 wt. % to about 60 wt. %, more preferably from 5 wt. % to 50 wt. %, still more preferably from 10 wt. % to 40 wt. % of the polymer composition. According to some embodiments, the polymer composition is free of a fibrous filler. In additional or alternative embodiments, the polymer composition can be free of a particulate filler. In some embodiments, the polymer composition is free of reinforcing fillers.

In some embodiments, one or more of the components is added to the reaction mixture before or during polymerization. In additional or alternative embodiments, one or more of the components is added to the resin after polymerization. In embodiments in which the polymer composition components are added after polymerization, the PAES resin can be combined with the one or more components via any suitable method known in the art (e.g. extrusion).

Articles

As discussed above, halogen free polymer compositions can be desirable in many application settings including, but not limited to, electronic devices; plumbing fixtures, piping and manifolds; and membranes. Without being limited by a theory, it is believed that halogen containing polymer compositions can undesirably interfere with metal components of an electronic device. In particular, it is believe the halogen content in the polymer can degrade metal structures in contact with the polymer composition ("polymer-metal junction"). Accordingly, halogen free polymer compositions are highly desirable in electronic devices.

Desirably, the PAES polymer composition is formed into an electronic device component which is intended to form part of a polymer-metal junction when integrated into the electronic device. For example, the device can be a mobile electronic device and a component of the mobile electronic device can comprise the PAES polymer composition. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch and smart glasses), a camera, a portable audio player, a portable radio, a global position system receiver, and portable game console.

In some embodiments, at least a portion of a component of an electronic device can be exposed to the external environment of the electronic device (e.g., at least a portion of the component is in contact with the environment external to the electronic device). For example, at least a portion of the component can form at least a portion of the external housing of the mobile electronic device. In some such embodiments, the component can be a full or partial "frame" around the periphery of the mobile electronic device, a beam in the form of a lattice work, or a combination thereof. As another example, at least a portion of the component can form at least a portion of an input device. In some such embodiments, a button of the electronic device can include the component. In some embodiments, the component can be fully enclosed by the electronic device (e.g., the component is not visible from an observation point external to the mobile electronic device).

In some embodiments, the component can be of a mounting component with mounting holes or other fastening device, including but not limited to, a snap fit connector between itself and another component of an electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

The components of the electronic device can be fabricated using methods well known in the art. For example, the mobile electronic device components can be fabricated by methods including, but not limited to, injection molding, blow molding or extrusion molding. In some embodiments, the PAES polymer compositions can be formed into pellets (e.g., having a substantially cylindrical body between two ends) by methods known in the art including, but not limited to, injection molding. In some such embodiments, mobile electronic device components can be fabricated from the pellets.

Should the disclosure of any patents, patent applications, and publications which are incorporated herein by reference conflict with the description of the present application to the extent that it may render a term unclear, the present description shall take precedence.

EXAMPLES

The following examples demonstrate the synthesis and characterization of monomers and polymers according to the present description.

Example 1: Synthesis and Characterization of 4,4'-Sulfonyl Bis(Phenoxybenzene)

The following example demonstrates the synthesis and characterization of the monomer 4,4'-sulfonyl bis(phenoxybenzene), also called 4,4'-diphenoxydiphenyl sulfone ("DPDPS").

The synthesis was carried out in a 1 liter ("L") glass reaction flask equipped with a mechanical stirrer, a nitrogen inlet, a condenser, a trap for the distillates, a thermometer and heated using an oil bath. A reaction mixture was formed by adding 136.12 grams ("g") (1.173 mol) of sodium phenoxide having a purity of 98% (Alfa Aesar), 157 g of chlorobenzene having a purity higher than 99.5% (Sigma-Aldrich) and 315 g of sulfolane into the reaction flask. The reaction flask was purged with nitrogen and a constant flow of nitrogen was kept throughout the reaction. The reaction mixture was stirred at 150 rpm and maintained at a temperature of 160° C. for 30 minutes ("min") to dehydrate the reaction mixture.

A solution containing 150 g 4,4'-dichlorodiphenyl sulfone (0.522 mol, having a purity of 99.15% and supplied by Solvay) and 157 g chlorobenzene was added over 10 min to the reaction mixture. The temperature of the reaction mixture was subsequently raised to 180° C. and maintained at that temperature for 3 hours ("h"). The reaction mixture was subsequently cooled to 150° C. and 250 g NMP were added. The solid DPDPS was recovered by coagulation of the reaction mixture in deionized water, washed three times with deionized water at 60° C. and finally dried at 105° C. under vacuum overnight. The dried DPDPS was subsequently recrystallized with hot ethanol/toluene 50/50 v/v. The final product was dried again at 105° C. under vacuum overnight. The purity of the DPDPS was higher than 99.9% as measured by gas chromatography mass spectrometry ("GC-MS") and the melting point was 144° C. as measured by differential scanning calorimetry ("DCS").

Example 2: Synthesis of Poly(Phenyl Sulfone)

The following example demonstrates the synthesis and characterization of a PPSU polymer.

Three PPSU polymer samples were synthesized in glass reactors (samples 1-3) or a Hastelloy C-276 reactor (samples 4 and 4'), both equipped with a nitrogen inlet, a mechanical stirrer, a condenser, a trap and heated by a heating mantle. For each reaction in glass reactor (sample 1-3), 1 mol of DPDPS, 1 mol of 4,4'-biphenol and 0.03-0.2 moles of potassium carbonate were dried under vacuum at 100° C. and, subsequently, a reaction mixture was formed by introducing the dried components into the glass reactor. The reaction mixtures were heated under a stream of nitrogen at atmospheric pressure to maintain the reaction mixture at one or more reaction temperatures for one or more reaction times ("reaction parameters"). For samples synthesized using multiple reaction parameters, the reaction mixture was not allowed between the first and second set of reaction parameters. For sample 4, after initial reaction in presence of a 5 mol.-% excess of 4,4'-biphenol compared to the DPDPS monomer and only 0.25 mol percent base, the sample was cooled to room temperature and subsequently reheated to the same reaction temperature using a different set of ramp rates. For clarity, the reheated sample 4 is referred to as sample 4'. During heating, the distillate was collected for later analysis. The formed polymer was then cooled to room temperature and crushed to be removed from the reaction vessel. A light brown transparent polymer was obtained that had the same appearance as a poly(phenyl ether sulfone) ("PPSU") prepared using the traditional polymerization process, as described above. The product structure was confirmed to be PPSU using nuclear magnetic resonance ("NMR") spectroscopy. The reaction components, amounts and heating characteristics are displayed in Table 1, below. In Table 1, "RT" refers to room temperature (about 20° C.).

TABLE 1

|  |  | Sample No. | | | | |
| --- | --- | --- | --- | --- | --- | --- |
|  |  | 1 | 2 | 3 | 4 | 4' |
| DPDPS (mol) |  | 1 | 1 | 1 | 1 | 1 |
| 4,4'biphenol (mol) |  | 1 | 1 | 1 | 1.05 | 1.05 |
| $K_2CO_3$ (mol) |  | 0.2 | 0.1 | 0.03 | 0.0025 | 0.0025 |
| Reaction Parameters | $1^{st}$ Rxn. Time at $1^{st}$ Rxn. Temp | 6 h at 235° C. | 6 h at 325° C. | 7 h at 325° C. | 5 h at 280° C. | 4 h at 300° C. |
|  | $2^{nd}$ Rxn. Time at $2^{nd}$ Rxn. Temp |  |  |  | 4 h at 340° C. | 3 h at 340° C. |
| Mn (g/mol) |  | 900 | 2,150 | 3,910 | 3,240 | 5,380 |
| Mw (g/mol) |  | 1,370 | 3,200 | 7,320 | 6,240 | 13,970 |

Table 1 demonstrates that, for the samples tested, samples prepared with increased $K_2CO_3$ concentrations had decreased $M_n$ and $M_w$. For example, for samples 1 to 3 (0.2 mol, 0.1 mol and 0.03 mole $K_2CO_3$, respectively), the $M_w$ was 900, 2150 and 3910 g/mol, respectively, and $M_w$ was 1,370; 3,200 and 7,320 g/mol, respectively. However, comparison of sample 4 with samples 1-3 indicates that $M_n$ and $M_w$ of sample 4 were lower ($M_n$=3,240 and $M_w$=6,240 g/mol) than any of samples 1-3 despite having the lowest $K_2CO_3$ concentration (0.0025). However, comparison of sample 4' with samples 1-3 indicates that the aforementioned result with respect to sample 4 was due to an insufficient reaction time. In particular, $M_n$ and $M_w$ for sample 4' was 5,380 and 13,970 g/mol, respectively. During reheating of sample 4 to obtain sample 4', the distillate generated from the reheating contained phenol, indicating that the polymerization reaction was not complete in the first polymerization reaction to obtain sample 4.

Furthermore, the distillate generated during the syntheses of at least samples 1-3 contained biphenol. The presence of biphenol indicated a stoichiometric imbalance and may have limited the maximum molecular weight that could have been achieved. It is believed that the use of a pressurized vessel or an excess of biphenol may help to restore the stoichiometric balance.

Example 3: Synthesis of Polyphenylene Sulfone in a Hastelloy Reactor

The following example demonstrates the synthesis and characterization of a PPSU polymer.

The synthesis was carried out in a Hastelloy C-276 reactor equipped with a nitrogen inlet, a mechanical stirrer, a condenser, a trap and heated by a heating mantle. Prior to synthesis, the reactants (DPDPS, 4,4'-biphenol and $K_2CO_3$) were dried at 100° C. under vacuum. During the subsequent polymerization reaction, the reactants were heated at atmospheric pressure under a nitrogen flow and the distillate generated was condensed and accumulated in a trap for later analysis.

For sample 5, the polymerization reaction was performed by adding 1 mol DPDPS, 1 mol 4,4'-biphenol and 0.005 mol of $K_2CO_3$ into the reactor to form a reaction mixture. The reaction mixture was then heated to and maintained at a temperature of 330° C. for 10.5 h. After 2 h of heating at 330° C., a further 0.1 mol of 4,4'-biphenol and 0.0025 mol of potassium carbonate were added to the reaction mixture. After 3.5 h of heating at 330° C., another 0.1 mol of 4,4'-biphenol and 0.0025 mol of potassium carbonate were added to the reaction mixture. For sample 5', the sample 5 was reheated under a flow of nitrogen and maintained at a temperature of 330° C. for 14 h. During the reaction of sample 5', the viscosity of the PAES polymer melt became so high that the mixing element in the reactor was not able to stir the reaction mixture. The polymer was then cooled to room temperature and crushed to allow it to be removed from the reaction vessel. A light brown transparent polymer was obtained that had the same appearance as a PPSU polymer prepared using the traditional polymerization process.

As measured by GPC, $M_n$ and $M_w$ of sample 5 were $M_n$=3,360 g/mol and $M_w$=7,080 g/mol, respectively, while those of sample 5' were $M_n$=7,450 and $M_w$=25,450 g/mol, respectively. The aforementioned result demonstrates that the polymerization reaction continued during the reheating of sample 5 to form sample 5' (this result was confirmed by the distillate in sample 5', which showed the presence of phenol). Because of the very high viscosity encountered during the synthesis of sample 5', it is believed that the use of melt mixer, including but not limited to, a kneader or an extruder would allow for the synthesis of higher average molecular weight PAES polymers. Generally, kneaders and extruders are able to process higher average molecular weight polymers.

The embodiments above are intended to be illustrative and not limiting. In addition, although the present invention has been described with reference to particular embodiments, those skilled in the art will recognize that changes can be made in the form and detail without departing from the spirit and scope of the invention. Any incorporation by reference of documents above is limited such that no subject matter is incorporated that is contrary to the explicit disclosure herein.

The invention claimed is:

1. A method for making a poly(aryl ether sulfone) (PAES) polymer, the method comprising reacting a first monomer and a second monomer in a reaction mixture consisting of said first monomer, said second monomer, a base and optionally a solvent, wherein either
(A) the first monomer is a diphenol represented by the formula:

HO—$M_A$—OH  (M1), and the second monomer is a diarylether containing a sulfone represented by the formula:

$A^1$—O—$M_B$—O—$A^2$  (M2), or (B) the first and second monomer, identical or different, are selected from the group consisting of formulae:

$A^1$—O—$M_B$—O—$M_A$—OH  (M3),

$A^1$—O—$A^2$—$SO_2$—$M_A$—OH  (M4), and

HO—$M_A$—O—$M_B$—O—$M_A$—OH  (M5), wherein
$M_A$ is represented by the formula:

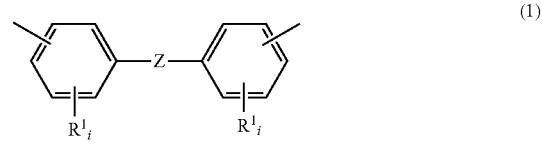

(1)

wherein each $R^1$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; each i is an independently selected integer from 0 to 4; and Z is a bond, —$SO_2$— or —$C(CH_3)_2$—;

MB is represented by the formula:

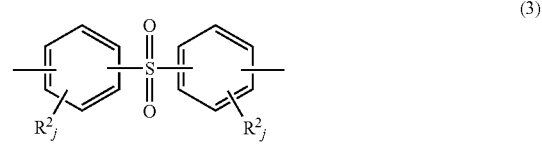

(3)

where each $R^2$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

$A^1$ and $A^2$ are represented by the following formulae, respectively:

(4)

and

(5)

where each $R^3$ and $R^4$ is independently selected from the group consisting of an alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and each j is an independently selected integer from 0 to 4, wherein the base comprises an alkali metal carbonate, and wherein the total base concentration is from about 0.0001 to about 0.04, relative to the total number of moles of monomer derived —OH groups in the reaction mixture.

2. The method of claim 1, wherein the total base concentration is at least about 0.0005 and is no more than about 0.04, relative to the total number of moles of monomer derived —OH groups in the reaction mixture.

3. The method of claim 2, wherein the total base concentration is at least about 0.001 and is no more than about 0.03, relative to the total number of moles of monomer derived —OH groups in the reaction mixture.

4. The method of claim 2, wherein the total base concentration is at least about 0.005 and is no more than about 0.02, relative to the total number of moles of monomer derived —OH groups in the reaction mixture.

5. The method of claim 1, wherein the reaction mixture has a halogen concentration of no more than about 300 ppm.

6. The method of claim 1, wherein the alkali metal carbonate is selected from the group consisting of sodium carbonate, potassium carbonate, cesium carbonate, lithium carbonate, and any combinations of two or more thereof.

7. The method of claim 1, wherein the reaction mixture is maintained at a reaction temperature from about 200° C. to about 450° C., during the reacting.

8. The method of claim 1, wherein the reaction mixture is maintained at the reaction temperature for a total reaction time of from about 1 hour to about 72 hours.

9. The method of claim 1, wherein the reaction mixture is maintained at a pressure of at least about 0.1 mbar to no more than about 0.9 bar.

10. The method of claim 1, wherein the first monomer is represented by the Formula (M1) and the second monomer is represented by the Formula (M2) and the reacting is represented by the following scheme

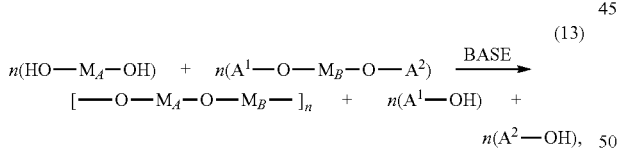

(13)

where n is any integer 1 or greater.

11. The method of claim 1, wherein the first monomer is represented by the Formula (M1) and the second monomer is represented by the Formula (M2) and the poly(aryl ether sulfone) (PAES) polymer comprises recurring units ($R_{PAES}$) represented by the formula —O—$M_A$—O—$M_B$—.

12. The method of claim 1, wherein the first monomer is the diphenol and the second monomer is the diarylether and wherein the relative diphenol molar ratio in the reaction mixture is at least about 0.5, and is no more than about 1.5, during at least a portion of the reacting.

13. The method of claim 1, wherein the first and second monomers are both represented by the same formula selected from the group consisting of Formula (M3), (M4) and (M5) and wherein the reacting is respectively represented by the formula:

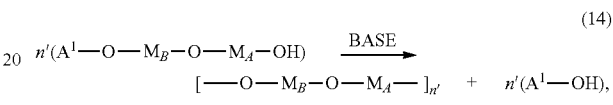

(14)

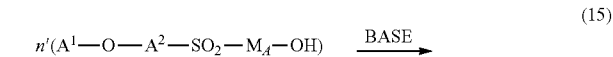

(15)

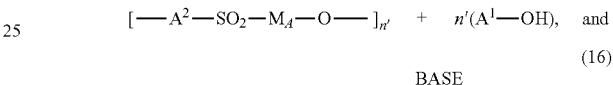

(16)

wherein n' is any integer 2 or greater.

14. The method of claim 1, wherein the first and second monomers are both represented by the same formula selected from the group consisting of Formula (M3), (M4) and (M5) and wherein the poly(aryl ether sulfone) (PAES) polymer has recurring units ($R_{PAES}$) respectively represented by the formulae:

(18),

(19),

(20).

15. The method of claim 1, wherein the reaction mixture is maintained at a pressure from about atmospheric pressure (1.01325 bar) to no more than about 50 bar.

16. The method of claim 1, wherein the reaction mixture is reacted for at least some reaction time in a melt-mixer.

* * * * *